Figure 1:
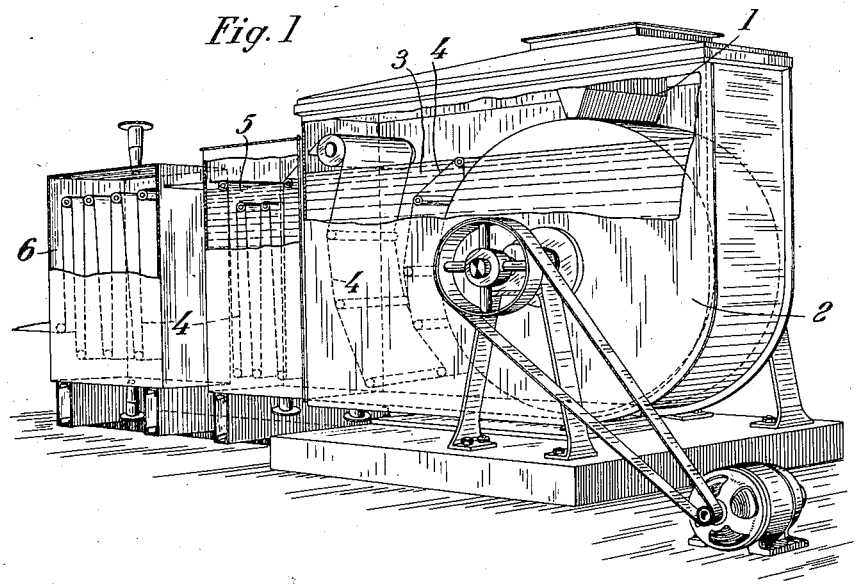

April 14, 1936.  A. WEIHE  2,037,292

MANUFACTURE OF FILMS

Filed April 15, 1933

Inventor:
Adolf Weihe,
By Attorneys

Patented Apr. 14, 1936

2,037,292

UNITED STATES PATENT OFFICE 2,037,292

MANUFACTURE OF FILMS

Adolf Weihe, Eilenburg in Sachsen, Germany, assignor to Deutsche Celluloid-Fabrik, Eilenburg in Sachsen, Germany, a corporation of Germany Application April 15, 1933, Serial No. 666,384
In Germany April 20, 1932

1 Claim. (Cl. 18—57)

My present invention relates to the manufacture of films from solutions of cellulose derivatives.

One of its objects is an improved process for the manufacture of films from a solution of cellulose derivatives by coagulation in a precipitating bath. Further objects will be seen from the detailed specification following hereafter.

Photographic films are usually made by dissolving a cellulose derivative, generally with addition of a gelatinizing agent, in an organic solvent or a mixture of organic solvents, filtering and deaerating the solution and casting or spreading it on a smooth surface. By application of heat and a current of air the solvent is evaporated and recovered in a more or less high degree by absorption, adsorption or condensation (cf. Ullmann, Enzyklopädie, 2nd edition, volume 5). The methods of recovering the solvent require a bulky apparatus consumption of energy, renewal of the absorbing or adsorbing agent and, in the case of the condensation, regeneration of the cooling liquid.

The present invention relates to a process whereby films which are well suited for photographic purposes can be obtained by the coagulation of a solution of a cellulose derivative (if necessary after filtration and de-aeration) in a precipitation bath consisting of a mixture of water and an aliphatic alcohol miscible with water in all proportions, by which bath the solvents are absorbed, the particular feature of the invention being indications for the composition of the solvent mixtures as well as for the precipitation baths, which enable those skilled in the art to ascertain for the various film-forming cellulose derivatives that particular composition of the solvents and the precipitation bath which yields a clear and mechanically resistant film.

The solvents applied in each particular case, are mixtures the individual constituents of which are non-solvents for the respective cellulose derivative. These non-solvents must be present in two unitary substances or mixtures of substances, one group of which is miscible with water in any proportion and the other group of which is insoluble in water or at least is not miscible with water in any desired proportion.

The application of this rule will more clearly result from the following explanations:

1. The above conditions are fulfilled for collodion cotton of a medium content of nitrogen (for instance 11.8 to 12.4 per cent) by, for instance, a mixture alcohol and ether. Alcohol is miscible with water in any proportion, and ether is soluble in water only to a low degree. It is possible to add to the ether other ingredients insoluble in water which are non-solvents for the collodion cotton, for instance, benezene, toluene and xylene. On the other hand the alcohol may be mixed with other ingredients which are soluble in water, for instance, n-propylalcohol, isopropyl alcohol and glycol; the addition of water may also be advantageous, however, only in such an amount that no precipitate occurs. Generally one will employ mixtures with as few constituents as possible in order to avoid difficulties in the rectification of the precipitating bath.

2. For collodion cotton with a higher content of nitrogen (for instance, 12.3 to 12.6 per cent) there may furthermore be used mixtures of methanol with benzene or toluene. Benzene and toluene are the components which are not miscible with water, methanol is miscible with water and to this component there may be added a small amount of water or water soluble alcohols. Though collodion cotton with the aforesaid content of nitrogen swells more or less in contact with methanol it does not form a real solution so that methanol can be regarded as a non-solvent in this case.

3. For collodion cotton with a low content of nitrogen (for instance 10.7 to 11.2 per cent) a mixture of benezene (toluene, xylene) and alcohol which has been so much diluted with water that it has no solvent power for the collodion fibers is well suited for carrying out the process.

4. For cellulose ethylether, for instance, with a content of 48 per cent of ethoxyl, a mixture of benzene and alcohol is well suited. Both components are non-solvents for cellulose acetate, the one component is miscible with water and the other is not miscible with water. The benzene may be replaced by other aromatic hydrocarbons, or may be used in admixture with the same; the alcohol may be mixed with isopropyl alcohol and the like.

5. The same principles apply for mixed ether esters of cellulose, for instance, nitrated cellulose ethyl ester.

6. Cellulose acetates, as far as they are not soluble in chlorinated alcohols alone, are preferably dissolved in mixtures of methanol (if desired with the addition of ethyl-alcohol, propanol, etc.) and chlorinated aliphatic compounds, for instance, methylene chloride, ethylene chloride, dichloro-ethylether.

The precipitation baths consist of a mixture of water and a substance which is miscible with water in any desired proportion. Primarily such aliphatic alcohols enter into consideration which are non-solvents for the cellulose derivatives to be precipitated. Whether or not a precipitation bath is suitable for the process according to the present invention furthermore depends on its capacity for forming a uniphase mixture with the solvents of the solution of the cellulose derivatives to be precipitated within certain limits.

These limits can easily be determined in each particular case by ascertaining the concentration of solvents in the precipitating bath, at which two phases begin to form.

When proceeding according to the present invention the formation of the film occurs surprisingly rapidly, much more rapidly than with the application of heat. This fact together with the possibility of avoiding a special plant for the recovery of solvents provides an essential technical progress in the manufacture of films.

While the film is being formed the solvents pass from the setting jelly-like cellulose derivatives into the precipitation bath, from which they may be removed in a continuous manner. This may be realized, for instance, by feeding the fresh precipitating liquid at the point where the film is stripped from the surface on which it is received and discharging the precipitating liquid enriched in solvents at the point where the solution of cellulose enters the precipitation bath.

The manufacture of films according to this invention may be effected, for instance, on one of the known casting devices as shown in Fig. 1. The casting solution flows from a casting vessel 1 on a rotating drum 2 with a highly polished surface through a slot in the casting vessel, thus forming a thin layer. The drum 2 rotates in the precipitating liquid 3. Shortly after leaving the slot or nozzle of the casting vessel, the viscous layer of cellulose derivative enters the precipitating liquid and congeals therein by increasing delivery of the solvents to the precipitating liquid. The coagulated layer 4 is drawn from the drum and by means of a system of rollers it is again guided through the precipitating liquid. Hereafter the film 4 is guided through a water bath 5 which extracts further quantities of solvent from the film. Finally the film is guided through a chamber 6 and exposed to the action of a current of warm air, whereby it is dried. The precipitating liquid is continuously regenerated.

In carrying out the process according to the present invention one is not bound to the usual film casting machines (casting machines provided with a travelling band or a rotating drum); on the contrary, it has been found that a considerably better result may be obtained by causing the solution to enter the precipitating bath through an adjustable slit, because the film, in this case, is exposed from both sides to the action of the precipitation bath. Solutions of cellulose derivatives having a high concentration and containing plastifiers insoluble in water, have proved particularly suitable for the purpose in question.

Figure 2:
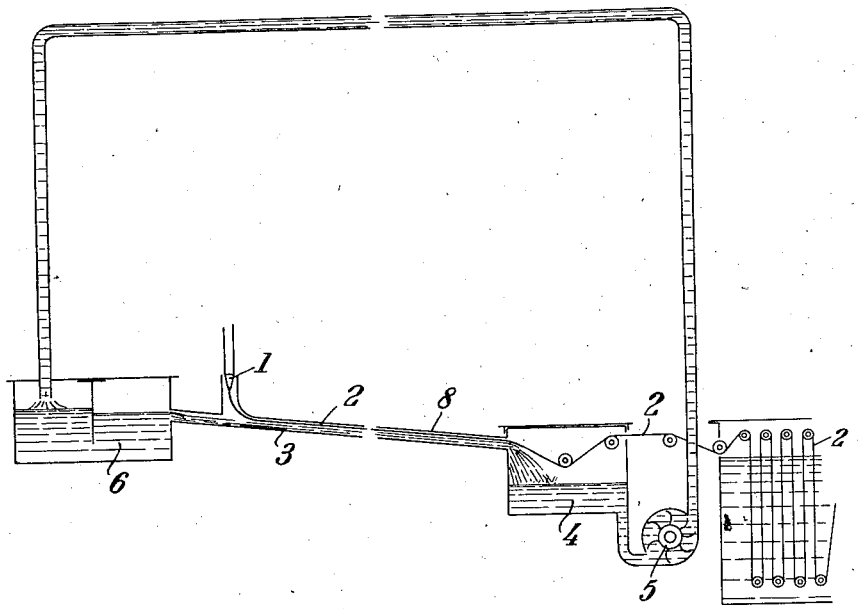

An apparatus for carrying out the process without the use of a solid casting support is diagrammatically represented in Fig. 2. The solution of cellulose derivative leaves the casting vessel through a slot and the layer formed falls in the flowing precipitating liquid 3 which forms the support for the cellulose derivative layer 2. The precipitating liquid and the coagulating film flow through a closed pit 8. At the end of the pit the film is guided over rollers into a water bath 7. Hereafter it is dried as above explained. The precipitating liquid 3 is received in a vessel 4 when issuing from the pit 8 and is pumped from this vessel by means of the pump 5 into the vessel 6 from which it flows in the pit. By these means losses of solvent are avoided.

The following examples illustrate the invention; the parts are by weight unless otherwise stated.

*Example 1*

| | Parts |
|---|---|
| Collodion containing 12% of nitrogen | 22 |
| Camphor | 3 |
| Alcohol of 92 per cent. strength | 20 |
| Ether | 55 | are made into a solution which in the form of a thin layer, is introduced into a precipitating bath which is composed of equal parts of water and alcohol of 94 per cent. strength. When treated in the precipitating bath having a temperature of 30° C., the foil of 0.5 mm. thickness is freed within 5 minutes, from the solvents and solidified to such an extent that it can be stripped off the surface on which it was cast. By placing the film in pure water any residues of the solvent are eliminated. The film may then be dried or it may be directly coated with a gelatin layer.

*Example 2*

20 parts of acetyl cellulose having 54 per cent. of bound acetic acid, with addition of 3 parts of tripropylphosphate are dissolved in a mixture of 62 parts of methylene chloride, 5 parts of methanol, and 10 parts of alcohol of 94 per cent. strength.

The film is formed in a mixture of 75 parts by volume of methanol and 25 parts by volume of water.

*Example 3*

25 parts of nitroethyl cellulose, prepared according to U. S. Patent 1,871,868 are dissolved in a mixture of 25 parts of alcohol of 94 per cent. strength and 50 parts of benzene.

The film is formed in a mixture of equal parts by volume of n-propylalcohol and water.

What I claim is:

A manufacture of films which comprises dissolving collodion cotton containing 12 per cent of nitrogen in a mixture of 20 parts of alcohol of 92 per cent strength, 55 parts of ether and 3 parts of camphor, and flowing said solution of collodion fibers through a slot into a precipitating bath consisting of equal parts of water and alcohol of 94 per cent strength.

ADOLF WEIHE.